United States Patent [19]
van Straaten et al.

[11] 3,991,270
[45] Nov. 9, 1976

[54] CIRCUIT ARRANGEMENT FOR LINE SYNCHRONIZATION IN A TELEVISION RECEIVER

[75] Inventors: Jan van Straaten; Adriaan Cense, both of Nijmegen, Netherlands

[73] Assignee: U.S. Philips Corporation, New York, N.Y.

[22] Filed: May 7, 1975

[21] Appl. No.: 575,442

[30] Foreign Application Priority Data

May 28, 1974 Netherlands......................7407097

[52] U.S. Cl. ......................................... 178/69.5 TV
[51] Int. Cl.² ............................................ H04N 5/04
[58] Field of Search............... 170/69.5 TV, 69.5 R, 170/69.5 P; 329/50; 328/63, 134; 307/269; 331/17, 18, 20

[56] References Cited
UNITED STATES PATENTS

| 2,697,131 | 12/1954 | Baroch | 178/69.5 TV |
| 3,127,570 | 3/1964 | Smuelers | 331/20 |
| 3,641,258 | 2/1972 | Steckler | 329/50 |
| 3,863,080 | 1/1975 | Steckler | 178/69.5 TV |

Primary Examiner—John C. Martin
Attorney, Agent, or Firm—Frank R. Trifari; Henry I. Steckler

[57] ABSTRACT

A line synchronizing circuit including a gated phase discriminator. Because the circuit may lock in to an equalizing pulse, which may give rise to a vertically divided image, gating is rendered inoperative for a given time after the post-equalization time.

5 Claims, 2 Drawing Figures

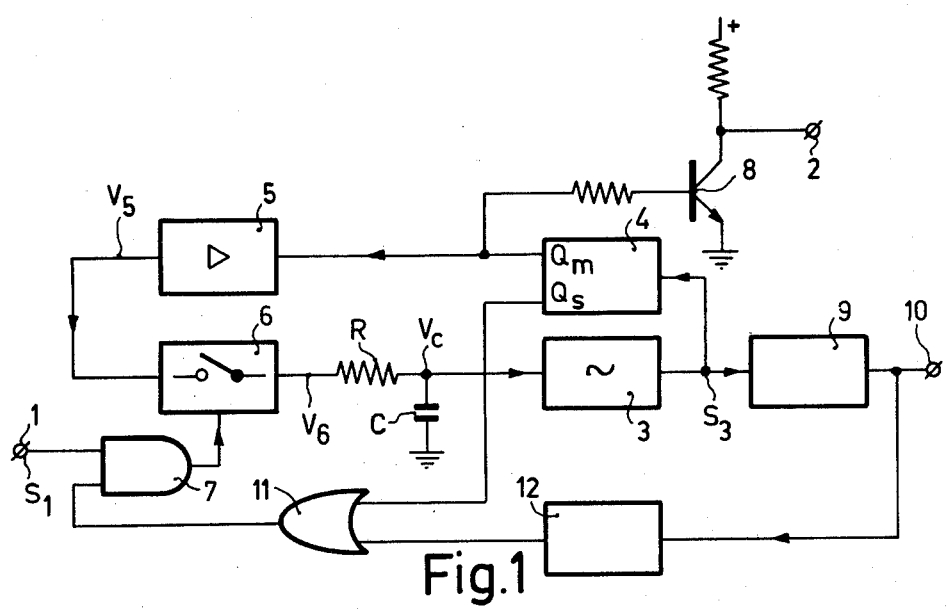
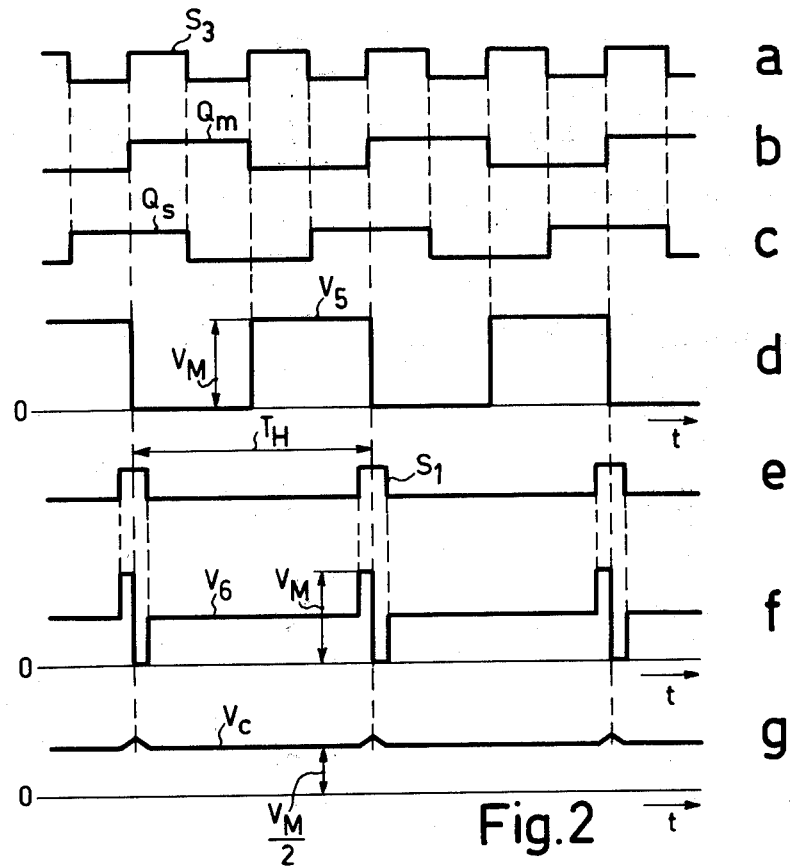

CIRCUIT ARRANGEMENT FOR LINE SYNCHRONIZATION IN A TELEVISION RECEIVER

The invention relates to a circuit arrangement for line synchronisation in a television receiver suitable for receiving line-frequency and field-frequency signals and with means for applying a synchronising signal containing line synchronizing, pre-equalising and post-equalising pulses, which circuit arrangement includes a phase discriminator and an oscillator which is controllable in frequency and in phase, the phase discriminator being rendered inoperative at line-frequency by a gating signal derived from the signal generated by the oscillator.

In such a circuit arrangement the frequency and the phase of the incoming line synchronizing pulses is compared with the frequency and the phase of the line-frequency signal derived from the oscillator. This is effected by means of the phase discriminator so that a control voltage for the oscillator is produced.

In order to reduce the sensitivity to interference and/or to increase the lock-in range the gating signal is used, for owing thereto the phase discriminating is operative for only a small part of each line period so that noise and interference which may be superposed on the synchronizing signal cannot exert a deleterious influence during the remainder of the line period.

If, however, the circuit arrangement is locked in to an equalizing pulse, the subsequent line synchronizing pulses may fall within the part of the period in which the discriminator is inoperative. This condition may be stable, causing a vertically divided image to be displayed on the screen of the display tube of the receiver.

It is an object of the present invention to avoid the said undesirable phenomenon and for this purpose the circuit arrangements according to the invention is characterized in that it includes a pulse shaper for producing a pulse for eliminating the influence of the gating signal after the post-equalising pulses.

An embodiment of the invention will now be described by way of example, with reference to the accompanying diagrammatic drawings, in which:

FIG. 1 is a schematic circuit diagram of an embodiment of the circuit arrangement according to the invention, and FIG. 2 shows waveforms which occur therein.

Referring now to FIG. 1, a sequence of periodic pulses appear at an input terminal 1. If the circuit arrangement according to the invention is used in a television receiver, the said pulses contain line synchronizing pulses at the line repetition frequency $f_H$, which is, for example, 15,625 Hz according to the C.C.I.R. standard and 15,750 Hz according to the R.T.M.A. standard respectively. They are derived in known manner from the received signal in a synchronisation separator stage, not shown. At an output terminal 2 of the circuit arrangement pulses appear which have the frequency $f_H$ and the same phase as the pulses at the terminal 1. The output pulses are applied to an output stage, not shown, which supplies a line-frequency current to the deflection coil for horizontal deflection in the receiver.

The circuit arrangement of FIG. 1 includes an oscillator 3 which is controllable in frequency and in phase and generates a signal the frequency of which, in the synchronized condition, is $2f_H$, that is to say twice that of the incoming line synchronizing pulses. The oscillator 3 may consist, for example, of bistable elements and its output signal $S_3$, the waveform of which is shown in FIG. 2a, is applied to a stage 4.

The stage 4 consists of a frequency divider circuit having two output signals which are mutually shifted in phase as shown by the waveforms of FIG. 2b and FIG. 2c. The signal at one output terminal $Q_m$ of the stage 4 passes to another level each time an ascending edge occurs in the signal of FIG. 2a, whilst the signal at the other output terminal $Q_s$ of the stage 4 passes to another level at each descending edge of the signal of FIG. 2a. If the latter signal is symmetrical, as is the case in FIG. 2a, the transitions of the signal of FIG. 2b and those of the signal of FIG. 2c lie at the middle of the level portions of the signal of FIG. 2c and of FIG. 2b respectively. The stage 4 is a binary divider circuit of a known type, for example a master-slave flip flop.

The output terminal $Q_m$ is connected to an amplifier 5 capable of supplying a current which may be positive and negative. This current charges and discharges respectively a capacitor C via a resistor R in the time interval in which a controllable switch 6 is closed, i.e. is conducting. The switch 6 can be rendered conducting by the output signal of an AND gate 7 one input terminal of which is connected via an OR gate 11 to the output terminal $Q_s$ of the flipflop 4 and the other input terminal of which is connected to the terminal 1. The gate 11 will be disregarded for the time being.

FIG. 2e shows the synchronizing signal $S_1$ at the terminal 1 in the condition of the circuit arrangement in which a synchronizing pulse occurs symmetrically with respect to the middle of the time interval in which the signal of FIG. 2c is "high". FIG. 2d shows the output voltage $V_5$ of the amplifier 5. This voltage is zero when the signal at the terminal $Q_m$ is high, and assumes a value $V_M$ when the said signal is "low". In FIG. 2 the symbol $T_H$ indicates the line period. Under these circumstances the swich 6 conducts. During the first half of the duration of a synchronizing pulse the capacitor C is charged to the voltage $V_M$ and during the second half it is discharged to zero. FIG. 2f shows the waveform of the voltage $V_6$ between the switch 6 and the resistor R. Owing to the integrating effect of the network R, C there is set up across the capacitor C a substantially constant voltage $V_C$ (FIG. 2g) which is equal to one half of the voltage $V_M$. This is the nominal value at which the oscillator 3 is adjusted to the nominal frequency and phase. One of the signals at the output of the stage 4, for example that at the terminal $Q_m$, controls the base of a transistor amplifier 8 the collector of which forms the output terminal 2 of the circuit. Because the stage 4 and the transistor 8 cause a negligible delay, the output signal at the terminal 2 has the same frequency and the same phase as the input signal at the terminal 1.

The signal $S_3$ available at the output terminal of the oscillator 3 is applied to a further frequency divider circuit 9 in which its frequency $2f_H$ is divided by the number of lines per picture in the particular standard, for example 625 or 524 respectively. Thus there is produced at the output terminal 10 of the divider circuit 9 a field-frequency signal of, for example, 50 Hz or 60 Hz the phase of which still is to be compared with the received field synchronizing signal. Such field synchronizing circuits are known and are described, for example, in U.S. No. 3,904,823.

If there is a phase difference between the waveforms of FIG. 2d and FIG. 2e, the voltage $V_C$ will assume a constant value other than $V_M/2$, and may lie between 0 and $V_M$. As a result the oscillator 3 will be adjusted until the correct phase, that is the phase of FIG. 2, is obtained. The foregoing shows that the switch 6 behaves as a phase discriminator the maximum output voltage of which is determined by the amplitude of the output voltage $V_5$ of the amplifier 5. The voltage $V_5$ thus is the reference voltage for the phase discriminator. It can be shown that the control voltage $V_C$ is substantially a linear function of the phase difference between the synchronizing signal and the reference voltage.

If, for example during lock-in, the frequency of the signal $S_3$ differs from the value $2f_H$, the phase difference between the signals $S_1$ and $S_3$ varies continuously. The voltage $V_C$ varies periodically between 0 and $V_M$ until the signal $S_3$ has the correct frequency, whereupon the aforedescribed phase locking process takes place.

Because the signal $Q_s$ has a gating effect, the sensitivity of the circuit to noise and interference which may be superimposed on the signal $S_1$ is reduced. If the equalizing pulses at the repetition frequency $2f_H$ which occur before and after the field synchronizing pulses. If the circuit is locked to a given equalizing pulse, for example when the receiver is switched from one transmitter to another, the oscillator 3 is supplied with the nominal control voltage, for the said pulse occurs in the time interval in which the signal $Q_s$ is high, the next pulse occurs when $Q_s$ is low so that the switch 6 is non-conducting, and the next subsequent pulse occurs a line period $T_H$ after the occurrence of the first considered pulse. After a field this situation repeats. The equalizing pulses are handled by the circuit as if they were line synchronizing pulses.

If the said equalizing pulse occurs an even multiple of $T_H/2$ after the last line synchronizing pulse of the preceding field period, synchronization is correct, for the line synchronizing pulses following the post-equalizing time interval also occur an even multiple of $T_H/2$ thereafter. If, however, the said equalizing pulse occurs an odd multiple of $T_H/2$ after the last line synchronizing pulse of the preceding field period, all subsequent line synchronizing pulses are gated away by the signal $Q_s$ and cannot reach the switch 6. The oscillator 3 is synchronized, and this condition may be stable. This means that all the lines traced on the screen of the display tube of the receiver start from the middle of the period $T_H$. The picture displayed shows a wide black vertical bar in the middle of the screen, which is the image of the line synchronizing pulse, with one half of the picture information to the left and the other half to the right of the bar.

The gate 11 is provided to eliminate the aforedescribed effect. The terminal $Q_s$ is not connected to an input terminal of the gate 7, as has been assumed so far, but to an input terminal of the gate 11. The output terminal of this gate is connected to the said input terminal of the gate 7, and to another input terminal of the gate 11 a signal is applied which is produced by an pulse shaper 12. The pulse shaper 12 is connected to the gate 11 and in known manner, for example by means of a monostable multivibrator, stretches the field-frequency pulses at the terminal 10 to a given duration, for example a given number of line periods, after the end of the post-equalizing time interval. If the frequency divider circuit 9 comprises binary dividers, a signal having a duration of $8T_H$ may simply be derived.

During the occurrence of the pulse produced by the pulse shaper 12 the gating pulses from the terminal $Q_s$ cannot have any effect. For this purpose it is required that the pulse produced by the pulse shaper 12 has suitable polarity. If the aforedescribed condition of incorrect synchronization during one of the equalizing time intervals has occurred, the correct condition will now be achieved, for now line synchronizing pulses will normally be applied to the switch 6. It is true that noise and interference are also transmitted, however, only for the duration of the pulse from the pulse shaper 12, for example during eight line periods, so that they are substantially prevented from exerting a deleterious influence.

The embodiment of FIG. 1 relates to a circuit arrangement in which digital means are used and the frequency of the oscillator is twice that of the line frequency. It will be evident that the step according to the invention need not be restricted to this embodiment but may be applied to any circuit arrangement in which the phase discriminator is gated. Such a circuit arrangement is described, for example, in U.S. Pat. No. 3,223,942.

It should be mentioned that the circuit arrangement of FIG. 1 can be differently designed within the scope of the invention. For example, the pulse from the pulse shaper 12 may be used to block the application of gating pulses to the gate 7 or to influence the operation of the switch 6. It should further be mentioned that the circuit arrangement of FIG. 1 is suitable for manufacture in monolithic integrated-circuit form.

What is claimed is:

1. Circuit arrangement for line synchronisation in a television receiver suitable for receiving line-frequency and field-frequency signals, and with means for applying, pre-equalizing and post-equalizing pulses, which ing, pre-equalizing and postequalizing pulses, which circuit arrangement includes a phase discriminator, an oscillator coupled to said discriminator and which is controllable in frequency and in phase, means for rendering the phase discriminator inoperative at line frequency by a gating signal derived from the signal generated by the oscillator, and a pulse shaper means for producing a pulse for eliminating the influence of the gating signal after the post-equalizing pulses.

2. Circuit arrangement as claimed in claim 1, wherein field-frequency signals are applied to the pulse shaper.

3. Circuit arrangement as claimed in claim 1, further comprising a first gate having a pair of input means for receiving the gating signal and the pulse produced by the pulse shaper respectively, and an output, and a second gate having a first input means for receiving the synchronizing signal, a second input coupled to said first gate output, and an output coupled to said discriminator.

4. Circuit arrangement as claimed in claim 1, wherein the said pulse has a duration which is equal to an integral multiple of line periods.

5. Circuit arrangement as claimed in claim 3, wherein at least the phase discriminator, the oscillator, the pulse shaper and the gates are manufactured in monolithic integrated circuit form.

* * * * *

UNITED STATES PATENT AND TRADEMARK OFFICE
CERTIFICATE OF CORRECTION

PATENT NO. : 3,991,270
DATED : November 9, 1976
INVENTOR(S) : JAN VAN STRAATEN ET AL It is certified that error appears in the above-identified patent and that said Letters Patent are hereby corrected as shown below:

Claim 1, line 4, after "ing," insert -- a synchronizing signal containing line synchronizing, --;

line 5, cancel the line in its entirety;

Signed and Sealed this

Fourth Day of January 1977

[SEAL]

Attest:

RUTH C. MASON
Attesting Officer

C. MARSHALL DANN
Commissioner of Patents and Trademarks